(12) United States Patent
Grimm et al.

(10) Patent No.: US 9,336,234 B2
(45) Date of Patent: May 10, 2016

(54) ONLINE CONTENT MANAGEMENT SYSTEM WITH UNDO AND REDO OPERATIONS

(71) Applicant: Adobe Systems Incorporated, San Jose, CA (US)

(72) Inventors: Stefan Andreas Grimm, Weil am Rhein (DE); David Benjamin Nuescheler, Salt Lake City, UT (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 559 days.

(21) Appl. No.: 13/774,572

(22) Filed: Feb. 22, 2013

(65) Prior Publication Data

US 2014/0244713 A1    Aug. 28, 2014

(51) Int. Cl.
  G06F 17/30 (2006.01)
  H04L 29/06 (2006.01)
  G06F 11/14 (2006.01)

(52) U.S. Cl.
  CPC ........ *G06F 17/3023* (2013.01); *G06F 11/1448* (2013.01); *G06F 11/1471* (2013.01); *G06F 17/30238* (2013.01); *H04L 67/42* (2013.01)

(58) Field of Classification Search
  CPC ..... H04L 65/1093; H04L 67/02; H04L 67/42; G06F 17/30; G06F 17/30244; G06F 17/3023; G06F 17/30238; G06F 11/1471; G06F 11/1458; G06F 11/1448; G06Q 10/10
  See application file for complete search history.

(56) References Cited

U.S. PATENT DOCUMENTS

| | | | |
|---|---|---|---|
| 6,192,378 B1 | 2/2001 | Abrams et al. | |
| 7,823,060 B2 | 10/2010 | Mohamed | |
| 8,364,648 B1 * | 1/2013 | Sim-Tang | G06F 17/30368 707/674 |
| 2005/0160101 A1 * | 7/2005 | Gallagher | G06F 17/30595 |
| 2009/0106110 A1 * | 4/2009 | Stannard | G06Q 10/00 705/14.1 |
| 2009/0327358 A1 * | 12/2009 | Lukiyanov | G06F 17/30038 |
| 2010/0257457 A1 * | 10/2010 | De Goes | H04L 65/1093 715/751 |
| 2010/0281362 A1 | 11/2010 | Bailor et al. | |
| 2011/0047484 A1 * | 2/2011 | Mount | H04L 12/4625 715/753 |
| 2011/0107246 A1 | 5/2011 | Vik | |
| 2014/0304840 A1 * | 10/2014 | Ohkado | G06F 21/60 726/31 |

OTHER PUBLICATIONS

"Undo, redo, or repeat an action", printed from office.microsoft.com/en-us/word-help/undo-redo-or-repeat-an-action-HP001216394.aspx on Jan. 21, 2013.

(Continued)

*Primary Examiner* — Ramy M Osman
(74) *Attorney, Agent, or Firm* — Finch & Maloney PLLC

(57) ABSTRACT

Techniques are disclosed for facilitating the process of undoing and redoing modifications that are made to content using an online content management system (CMS). As a user makes changes to content, such as by editing a webpage using a web-based CMS, a history of the user's modifications is generated and stored locally on the client. When the user invokes an undo command, the modification history can be used to determine a previous state of the content and restore the content to that previous state. Similarly, when the user invokes a redo command, the modification history can be used to return to a state that had previously been undone. In some embodiments, the process of undoing or redoing the user's modifications is selectively performed on either a client side or a server side of the online system, depending on the type of content that is being manipulated.

20 Claims, 6 Drawing Sheets

(56) References Cited

OTHER PUBLICATIONS

"Undo or redo typing or design changes", printed from office.microsoft.com/en-us/access-help/undo-or-redo-typing-or-design-changes-HA010229709.aspx?CTT=5&origin=HP001216394 on Jan. 21, 2013.

"UndoManager and DOM Transaction", printed from https://dvcs.w3.org/hg/undomanager/raw-file/tip/undomanager.html on Jan. 21, 2013.

* cited by examiner

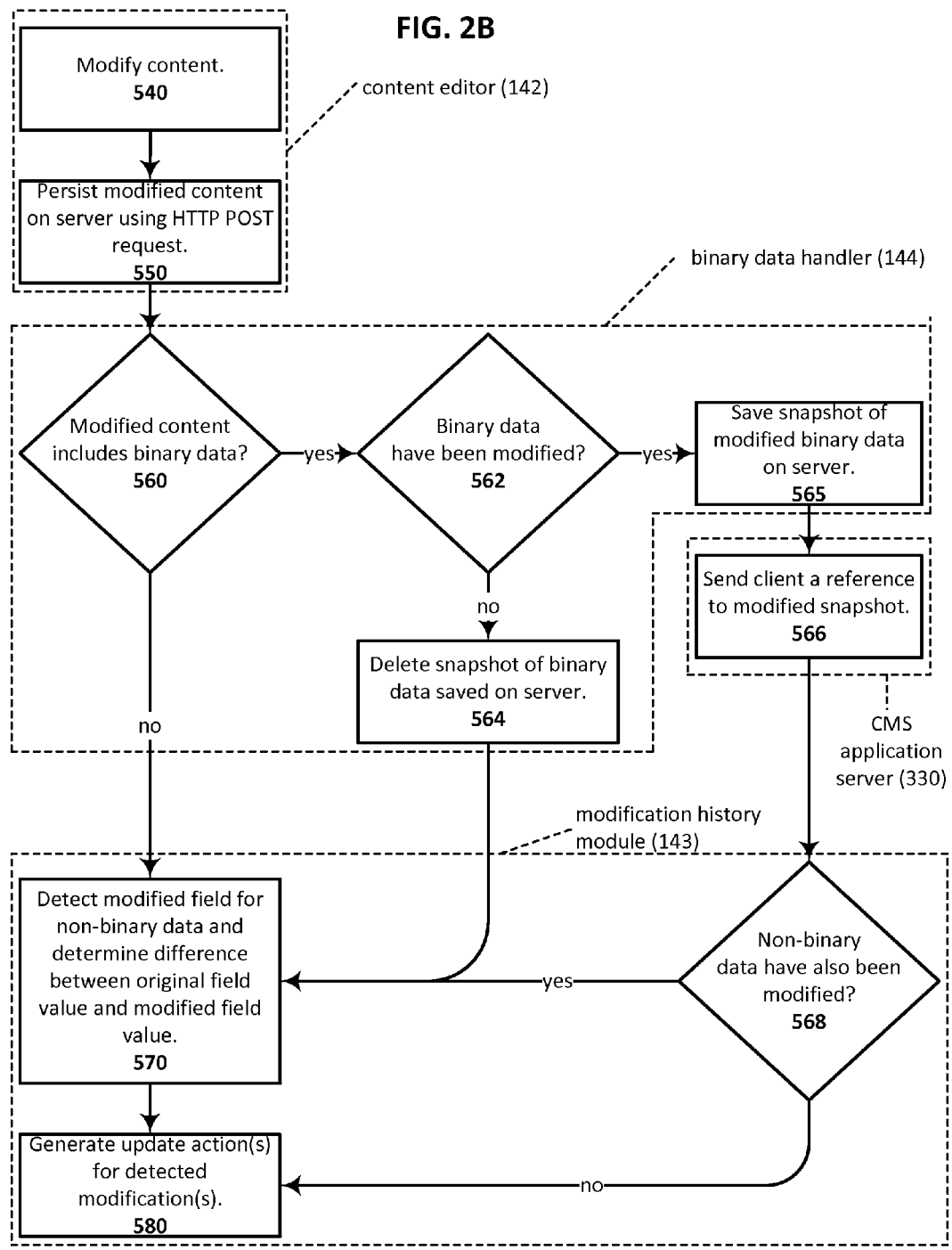

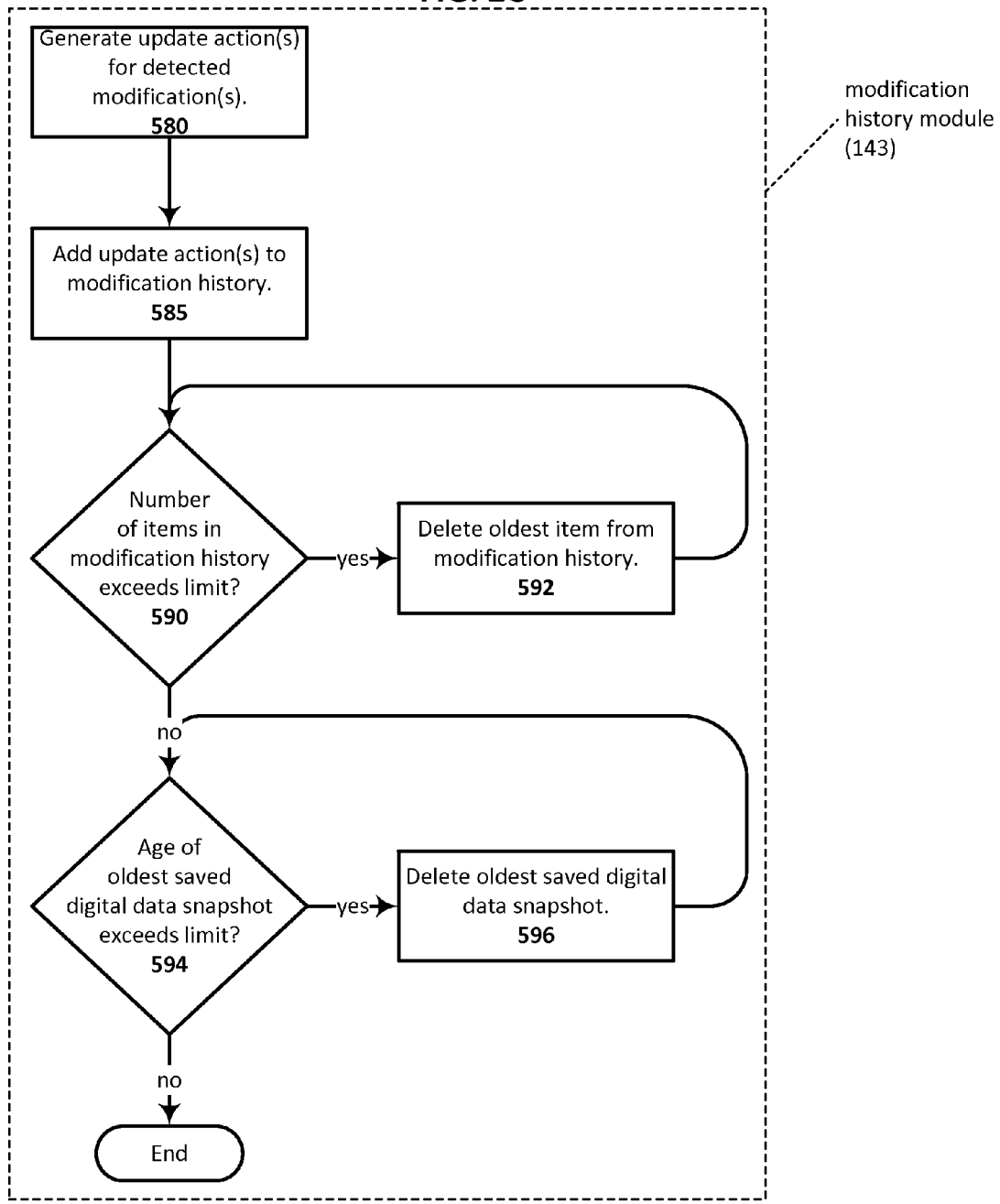

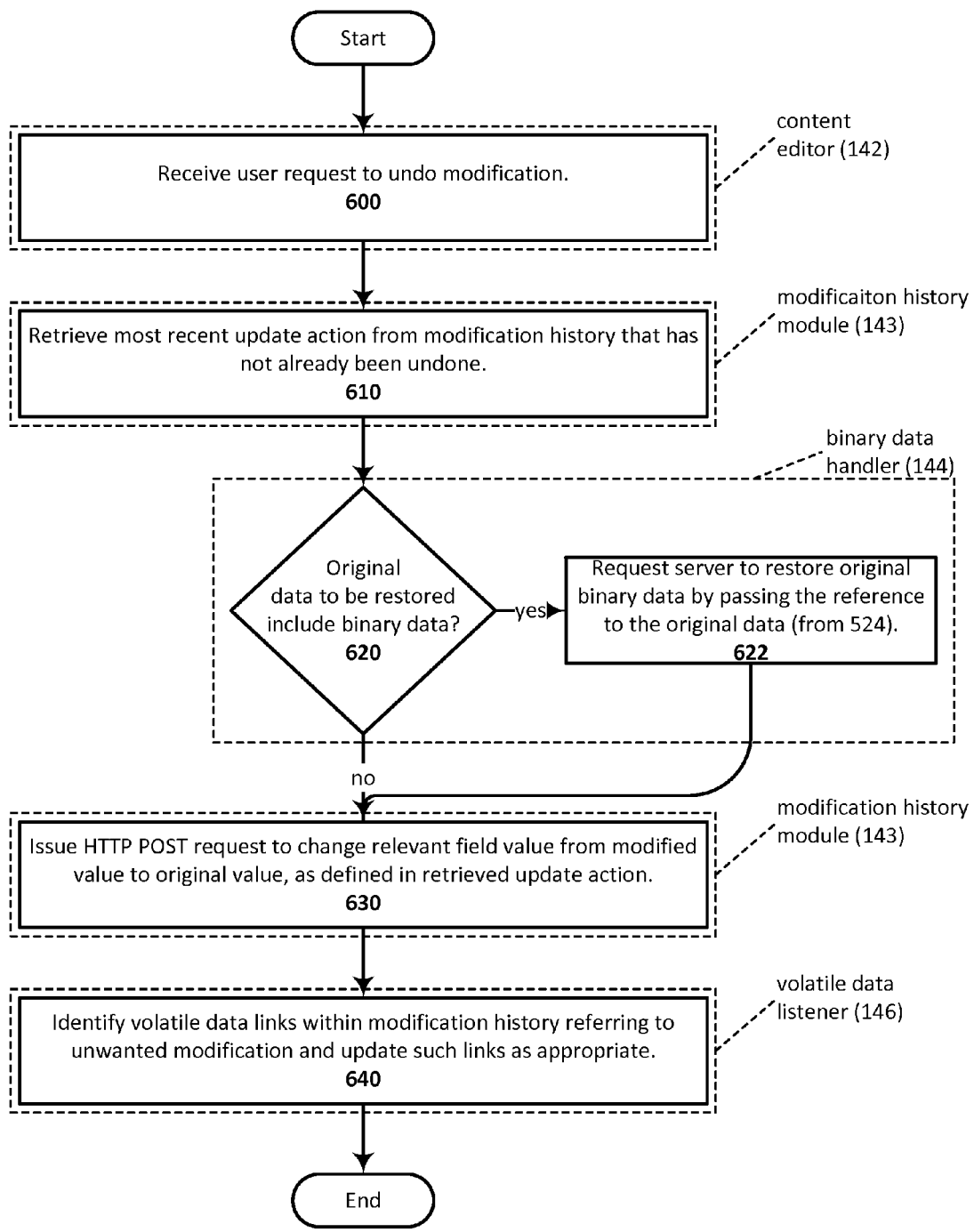

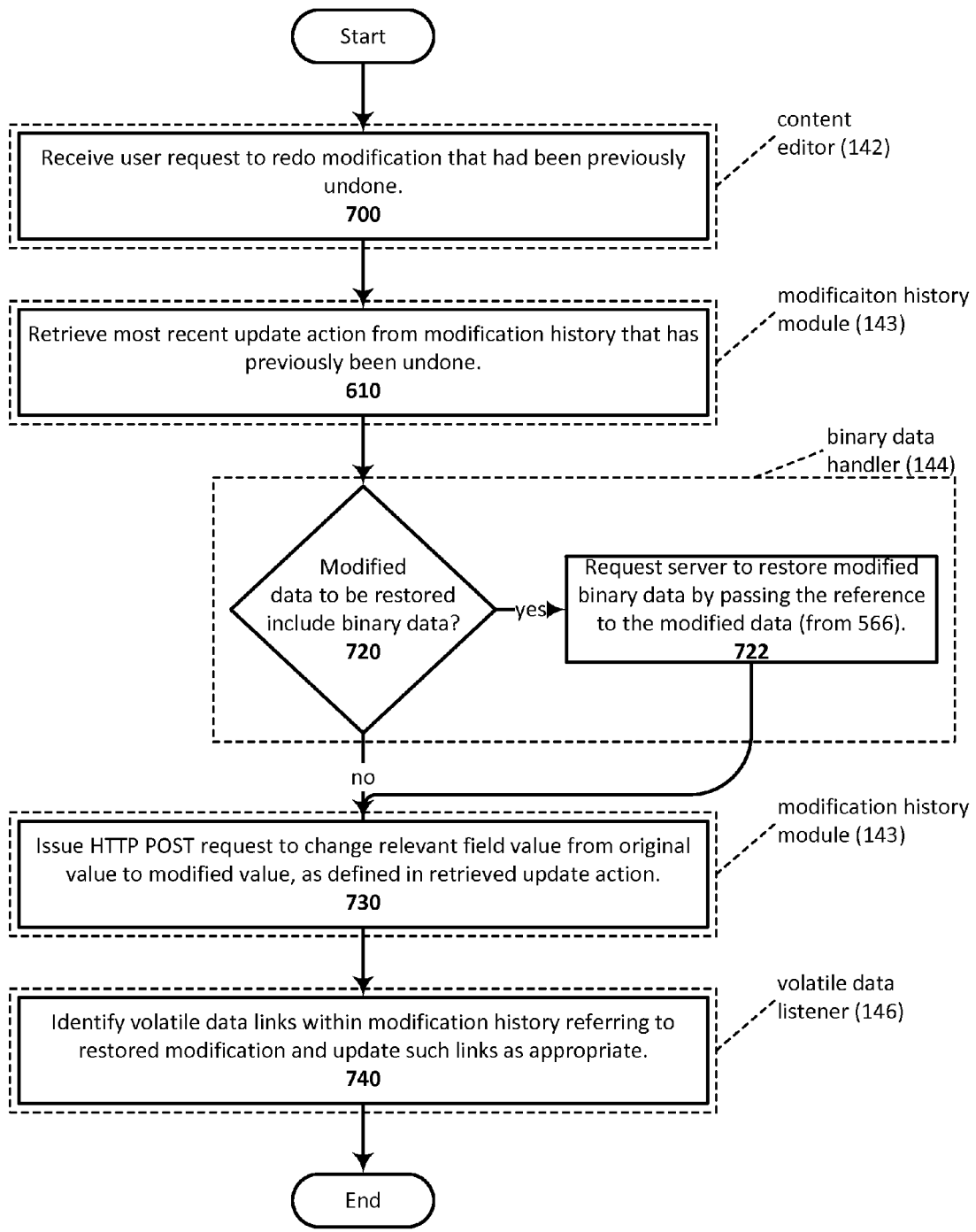

ONLINE CONTENT MANAGEMENT SYSTEM WITH UNDO AND REDO OPERATIONS

FIELD OF THE DISCLOSURE

This disclosure relates generally to content management systems, and more particularly, to techniques for modifying content using an online content management system.

BACKGROUND

As is generally known, digital content or so-called digital media ('content' hereinafter) may come in any number of forms, including text, graphics, images, animations, audio and/or videos files, for instance. As is further known, the process of content generation is often an iterative process that involves making several revisions to a given piece of digital work before it is finalized. The digital work may be for example, a textual document, a photo or montage of photos/graphics, or a so-called rich media document that includes a combination of content types, such as a document that includes textual content and embedded video and/or audio content. Numerous devices and methods have been developed to facilitate the process of generating and modifying content. These developments are commonly implemented on stand-alone computer-based word processing and desktop publishing systems having the capability to undo and redo multiple changes made to a document. More recently, web-based content management systems (CMS) have become available. A web-based CMS is typically a software system that allows users to create and manage website or so-called online content. Some such web-based CMSs allow for collaboration such that multiple users (authors) can participate in the creation and editing process.

BRIEF DESCRIPTION OF THE DRAWINGS

FIG. 2B illustrates a methodology for processing content modifications made using the online content management system of FIG. 1, in accordance with an embodiment of the present invention.

FIG. 2C illustrates a methodology for managing update actions generated in response to content modifications made using the online content management system of FIG. 1, in accordance with an embodiment of the present invention.

FIG. 3 illustrates a methodology for undoing content modifications using the online content management system of FIG. 1, in accordance with an embodiment of the present invention.

FIG. 4 illustrates a methodology for redoing previously undone content modifications using the online content management system of FIG. 1, in accordance with an embodiment of the present invention.

DETAILED DESCRIPTION

Figure 1:
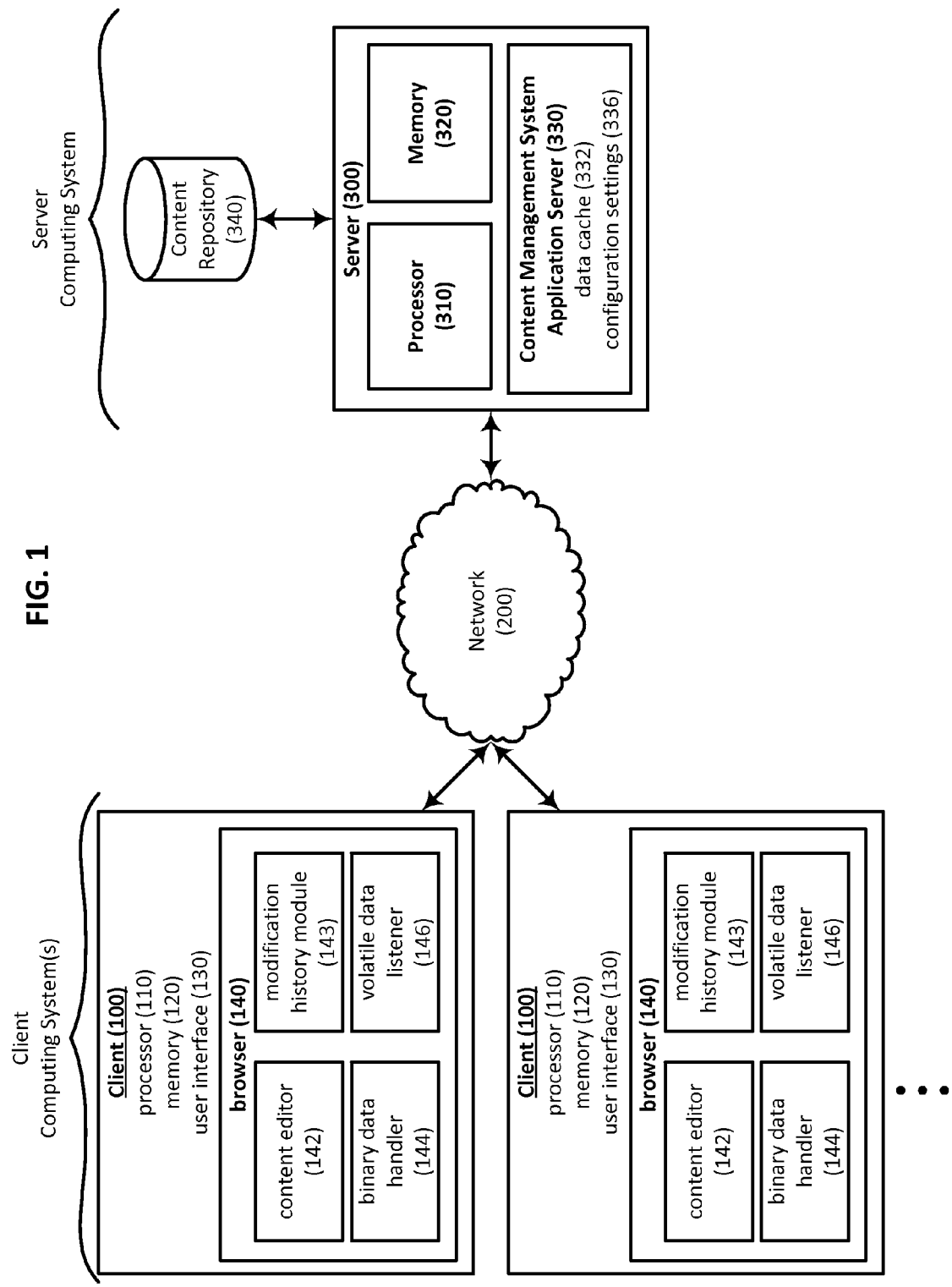
FIG. 1 is a block diagram of an online content management system configured for modifying content in an online environment in accordance with an embodiment of the present invention.

Techniques are disclosed for facilitating the process of undoing and redoing modifications that are made to digital content using a content management system (CMS) operating in a client-server environment, such as a web-based CMS. In accordance with some embodiments, the techniques are implemented in a 'client-side-first' configuration that operates to reduce server load (as compared to fully server-based solutions) when processing undo and redo requests with respect to modifications made to the subject content. To this end, the client-side can be configured to carry out undo/redo processing as far as possible to avoid unnecessary page reloads, and the server-side can be configured to handle any undo/redo processing not suitable for client-side execution. In particular, undo/redo requests with respect to non-binary content (such as text, etc) modifications can be processed on the client-side, and undo/redo requests with respect to binary data (such as images, etc) modifications can be processed on the server-side. The client-side functionality can be implemented, for example, in the browser of the client-side device that the user is using to access and edit the subject content, and the server-side functionality can be implemented on the server providing that content (although other implementations will be apparent in light of this disclosure). In one such example embodiment, the client-side includes a modification history module and a binary data handler (e.g., JavaScript modules executable in the client-side browser). The modification history module is programmed or otherwise configured to detect content modifications made by the user, and to generate a modification history that includes update actions corresponding to the various content modifications made. The binary data handler is programmed or otherwise configured to detect the presence of binary data in the content modifications detected by the modification history module, and to save a snapshot of the detected binary data on the server. In operation, when the user invokes an undo command with respect to non-binary data modifications (via an application interface provided on the client-side device), the modification history, which can be locally stored on the client-side device and accessed by client-side resources, can be used to determine a previous state of the content and restore that content to that previous state. Similarly, when the user invokes a redo command with respect to non-binary data modifications, the locally accessible modification history can be used to return to a state that had previously been undone. With respect to undo/redo commands associated with binary data modifications, a snapshot of the original or modified binary data can be retrieved from the server to complete the undo or redo request. In some embodiments, as undo and redo commands are processed, a volatile data listener (e.g., also executing in the client-side browser) can be programmed or otherwise configured to update volatile data links stored in the modification history. Volatile data links generally refer to links that go stale due to, for example, subsequent processing. For instance, paragraph paths can be used to address content in a given CMS. As such, if a paragraph is deleted and the deletion is undone, then the paragraph might be addressable by a different path than it originally was addressable by. Thus, the volatile data listener can be used to update such addressable paths and/or related information stored in the modification history such that current paths are known at any given time. By leveraging server resources sparingly, such configurations advantageously allow computer and network resources to be allocated more efficiently, and thereby provide the user with a more efficient and streamlined experience. Moreover, users can leverage the system without installing any software and with no or minimal configuration overhead. Numerous configurations and variations of such systems will be apparent, particularly in light of the detailed description provided herein in conjunction with FIGS. 1-4.

A CMS is a system that can be used in an online environment to generate, modify, publish, and/or maintain content that is stored in a data repository. A CMS therefore provides functionalities which are particularly adapted for workflow management in an online environment, such as version control functionality, indexing and searching functionality, and web content assembly and publishing functionality. Such functionalities are often, but not necessarily, further adapted to allow multiple users to work collaboratively with the content being managed by the CMS. Such systems can be used to manage a wide variety of different types of content.

Content refers generally, in addition to its ordinary meaning, to digital data structures which are capable of being managed by a CMS, including but not limited to webpages, textual documents, spreadsheets, presentations, photos and images, multimedia (for example, text, video, and/or audio) and other publications. Content can generally be categorized into either binary data or non-binary data. Binary data refers to digital data structures used to store items such as images, video clips, audio content and other multimedia content which is not easily cached using standard name-value pairs which can be persisted, for example, in a series of browser cookies or in the "window.name" object property. Binary data is to be distinguished from non-binary data, also often referred to as textual data, which includes data such as text objects, formatting information, data stored in HTML formats, and the like. In contrast to binary data, non-binary data is generally capable of being cached in the form of a name-value pair. It will be appreciated that a particular content object, such as a web page or rich media content, may include both binary data and non-binary data, and that the systems and methods disclosed herein are capable of responding to user modifications of such different types of data within the same content object differently.

CMSs are often implemented in a client-server computing environment that allows a plurality of different users to access the central content repository where the managed content is stored. In one embodiment, a client-server computing environment includes one or more client computing systems that are configured to access the resources of one or more server computing systems. Such resources may include processing resources as well as storage resources. Client refers generally to a computer system, including hardware and/or software, which can access resources provided by a separate server. A client may comprise, for example, a desktop or laptop computer, a workstation, a tablet, a smartphone, a set-top box or any other such computing device. Server refers generally to a computer system, including hardware and/or software, which can respond to such requests. A communication network is the medium by which a server communicates with a given client, and may include any private or public network, or a combination thereof. When a CMS is implemented in a client-server computing environment where the communications occur over a communication network, such a CMS is referred to as an online CMS. If the communication network includes the Internet, such a CMS is referred to as a web-based CMS. The functionalities of such online CMSs can be accessed using, for example, a web browser or any other suitable such application.

A. General Overview

As new technologies for generating content continue to develop, new challenges for modifying that content are presented as well. One such challenge relates to content modification using an online or web-based CMS. Unlike a stand-alone word processing system that uses the robust processing and content storage capability of a local computer system, an online CMS implicates the use of a separate server that can be accessed by remotely-located clients. One advantage of this configuration is that the clients do not require any specialized software to use the online CMS; rather, the functionality of the CMS can be accessed by the client using web browser software. However, because web browsers have limited functionality and resources compared to the server-side CMS, there are a number of non-trivial issues that arise in the context of implementing robust content modification functionality in an online CMS. For example, the use of the hypertext transfer protocol (HTTP), which is a stateless protocol, can result in a user's webpage being reloaded from the server frequently, thus providing a slow and interrupted user experience. This can be especially problematic when working with binary data, which web browsers have limited ability to access in a way that is required for typical content modification operations. Web-based content modification operations should also be compatible with complex data structures, such as linked, volatile or otherwise customized content types, since such complex data structures are frequently used in webpage design applications.

Thus, and in accordance with an embodiment of the present invention, techniques are provided herein that facilitate the process of generating and modifying content using an online CMS. The techniques can be implemented, for example, as the client-server system illustrated in FIG. 1, in accordance with one example embodiment. Multiple content modifications can be undone and redone based on a user's changing preferences during the content generation process using such a system. For example, in certain embodiments the processing of a user's undo or redo request is performed using the computing resources of a given client computer 100 when possible, thereby providing a system that can respond quickly to such requests without frequent page reloads. However, the system can also be configured to detect undo or redo requests for which the given client computer 100 is unable to perform the requested modification, or is otherwise unable to perform that modification efficiently. In such cases the request can be carried out using the computing resources of a server 300, thereby providing a robust system that can handle a wider variety of content modification requests for a wider variety of data structures. The system can also be configured to maintain a history of content modifications so that multiple modifications can be undone or redone. This modification history can be generated and stored locally at the client computer 100. Additional details of the system shown in FIG. 1 will be provided in turn.

The various embodiments of the systems and methods disclosed herein can be configured to work with a wide variety of different content types stored in a content repository that is accessible using an online CMS. Such a content repository may be, for example, an Internet-based or "cloud" repository, or it can be a shared storage resource accessible using a network such as a local area network and/or a wide area network. Compatible content types include, but are not limited to, text and rich media documents, images, video and/or audio content. Multimedia objects can be managed individually, or they can be embedded within other content that is managed using the online CMS. Example document formats that can be used with the various embodiments disclosed herein include portable document format (PDF), rich text format (RTF), American Standard Code for Information Interchange (ASCII) format, hypertext markup language formats (such as HTML, HTM, MHTML and MHT formats), spreadsheet formats (such as Adobe PageMaker, Microsoft Excel and the like), image formats (such as JPEG, BMP, PNG and the like), presentation formats (such as Adobe Presenter, Microsoft PowerPoint and the like) and word processing formats (such as Microsoft Word, Corel WordPerfect and the like), just to name a few. In a more general sense, the content may include any type of content that is capable of being modified in the context of an online CMS. As will be appreciated in light of this disclosure, the systems and techniques provided herein can be used with any number of file types regardless of the media contained therein, and the claimed invention is not intended to be limited to any particular file format or underlying content type.

In some embodiments the user can customize how certain aspects of the content modification system operate. For example, in certain embodiments the user can configure a specific amount of time after which undo or redo operations are unavailable, or a specific maximum number of sequential modifications that can be undone or redone. Additionally or alternatively, the user can provide a list of unsupported components for which the undo or redo operations are disabled, thereby providing enhanced stability. These and other configurations can alternatively be hard coded or otherwise provisioned by default. Numerous other settings to customize the content modification system can be provided, as will be described in turn, and as will be appreciated in light of the foregoing disclosure.

B. System Architecture

FIG. 1 is a block diagram of an online content management system configured for modifying content in an online environment in accordance with an embodiment of the present invention. As can be seen, the system of this example embodiment includes one or more client computing systems 100 communicatively coupled to a server computer system via a network 200. The configuration of the server computing system can vary from one embodiment to the next, depending on factors such as the particular service being provided, but in this example case includes a server 300 that is operatively coupled to a content repository 340. A given client computing system 100 may be, for example, a desktop or laptop computer, a workstation, a tablet, a smartphone, a set-top box or any other such computing device. A combination of different devices may be used in certain embodiments. Although two client computing systems 100 are illustrated in FIG. 1, it will be appreciated that the embodiments of the present invention are not intended to be limited to a particular number of client computing systems, and that more or fewer such systems can be used in other embodiments. As will be further appreciated, the server computer system may also include, for example, redundancies to provide additional desired functionalities such as fault-tolerance and/or load balancing, as commonly done.

As can be seen in this example case, a given client computing system 100 includes a processor 110, memory 120 and a user interface module 130. The processor 110 can be any suitable processor, and may include one or more coprocessors or controllers, such as a graphics processor, to assist in device control. The memory 120 can be implemented using any suitable type of digital storage, such as one or more of a disk drive, a universal serial bus (USB) drive, flash memory and/or random access memory. The user interface module 130 is configured to provide information to, and to receive information and commands from, a user; it can be implemented with a variety of suitable input/output devices such as a display, a touchscreen, a speaker, a keyboard, a mouse and/or a microphone. The user interface module 130 may be installed local to one or more of the client computing systems 100, or it may be provided using an applet or other downloadable module that can be provisioned in real-time in response to a request for access to a server 300. In one such embodiment, the user interface module 130 is provisioned in real-time as a JavaScript application in response to a user request for access to the server 300, although other suitable code and provisioning schemes may be used in other embodiments. Other componentry and modules typical of a computing system, such as input devices, output devices, a networking module and an operating system, are not shown but will be readily apparent in light of this disclosure. It will be appreciated that the embodiments of the present invention are not intended to be limited to a particular configuration of the individual client computing systems 100, and that other configurations and components can be used in other embodiments.

As can be further seen in this example case, the client computing systems 100 each include a browser 140 that can be used to access and interact with remotely stored content. The browser 140 can retrieve the remotely stored content using any of a wide variety of standard transmission protocols, such as the HTTP or the file transfer protocol (FTP). In certain embodiments the browser 140 is capable of displaying or otherwise rendering a wide variety of content, including documents, images, audio, video and extensible markup language (XML) files, and optionally includes one or more plug-ins to support Adobe Flash applications, JavaScript applets and other content types. In addition, Asynchronous JavaScript and XML (AJAX) calls can be used for exchanging data asynchronously between browser 140 and server 300 to avoid full page reloads. This advantageously allows communications between the client 100 and the server 300 to occur in the background without interfering with the display and/or behavior of information provided via the browser 140. Examples of browsers which may be used in certain embodiments include Google Chrome, Microsoft Internet Explorer, and Mozilla Firefox; other browsers and comparable applications may be used in other embodiments as will be appreciated. In embodiments that include multiple client computing systems 100, the multiple clients may use a variety of different browsers. It will be appreciated that the embodiments of the present invention are not intended to be used with any particular browser or browser configuration, and other suitable technology can be used in implemented a client-side-first configuration as described herein.

As illustrated in the example embodiment of FIG. 1, the browser 140 can be used to implement the functionality of a web-based or online CMS, including, for example, the functionality associated with a content editor 142, a modification history module 143, a binary data handler 144 and a volatile data listener 146. Each of these browser-based modules can be implemented, for example, using JavaScript or other suitable code. The content editor 142 can be used to (a) generate new content which will be stored in the content repository 340, and/or (b) retrieve and modify content which has previously been stored in the content repository 340. The modification history module 143 can be used to monitor the modifications made using the content editor 142 and generate a modification history of such modifications. Such a history can be stored locally on the given client 100 and subsequently used to perform undo and redo operations. The binary data handler 144 can be used to detect modifications that affect binary data and to save snapshots of original and modified versions of the binary data using server resources. The binary data handler 144 can also be used to update the modification history as appropriate with respect to binary data modifications. The volatile data listener can be used, when applicable, to update volatile data within the modification history based on changes made as a result of undo or redo operations.

Still referring to the example embodiment illustrated in FIG. 1, the network 200 may be a public and/or private network, such as a private local area network operatively coupled to a wide area network such as the Internet. The connections between the client computing systems 100, the network 200 and the server 300 may be wired, wireless, or some combination of wired and wireless connections. The server 300 includes a processor 310 and a memory 320, and is configured to meet the computational demands of one or more application servers that run thereon, such as the CMS application server 330. The server 300 is also operatively coupled to one or more content repositories 340 that can be accessed by a given client 100 via the network 200. The server 300 is generally configured to selectively share its resources with the plurality of client computing systems 100; such resources include the computational resources of the processor 310, the application resources of application servers such as the CMS application server 330, and the storage resources of the content repositories 340. Example server-based operating systems which may be used in certain embodiments include Microsoft Windows Server, Oracle Solaris, or Mac OS X Server, although other operating systems can be used in other embodiments.

In operation, a user can interact with one or more of the client computing systems 100, for example by using a browser 140, to access the resources provided by the server 300. For instance, the user can access the resources of the CMS application server 330 by using the content editor 142 to (a) generate new content which will be stored in the content repository 340, and/or (b) retrieve and modify content which has previously been stored in the content repository 340. The CMS application server 330 can be configured to provide a wide range of functionality to the user via browser 140; examples of such functionality include text and multimedia editing including undo/redo functionality, find and replace, spell checking, version control and management of active content. Additional or alternative features may be provided in other embodiments. In one embodiment the CMS application server 330 is implemented using Adobe CQ Web Content Manager, although it will be appreciated that the embodiments of the present invention are not intended to be limited to use with any particular type of CMS application server.

Still referring to the example embodiment of FIG. 1, the CMS application server 330 optionally includes one or more subcomponents that can be used to carry out the various functionalities of a CMS. Such subcomponents can take the form of server-side modules which interact with and/or respond to certain of the client-side modules described herein. For example, in certain embodiments the CMS application server 330 includes a data cache 332 in which the snapshots generated by the binary data handler 144 can be saved. The CMS application server 300 may additionally or alternatively include a configuration setting manager 336 that allows users to edit and save selected configuration settings that affect the operation of the CMS application server 330. Other server-side modules can be used in other embodiments, as will be appreciated.

As will be further appreciated in light of this disclosure, the various modules and components of the system, such as the CMS application server 330 and the various client-side modules 142, 143, 144, and 146, can be implemented in software, such as a set of instructions encoded on a suitable computer readable medium that, when executed by one or more processors, cause the various methodologies provided herein to be carried out. The instructions can be encoded using a suitable programming language, such as C, C++, object-oriented C, JavaScript or BASIC, or alternatively, using custom or proprietary instruction sets. The computer readable medium may be a non-transient storage medium suitable for storing digital information, such as a hard drive, a server, flash memory and/or random access memory. In alternative embodiments, the components and/or modules can be implemented with hardware, including gate level logic such as a field-programmable gate array (FGPA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the functionality described herein. It will be apparent that any suitable combination of hardware, software and firmware can be used.

C. Undo and Redo Functionality

FIGS. 2A-2C, 3 and 4 collectively illustrate one embodiment of a content modification functionality that provides the ability to undo and redo multiple changes made to content using an online CMS. As can be seen, the methodology of this example embodiment includes a number of phases and sub-processes, the sequence of which may vary from one embodiment to the next. However, when considered in the aggregate, these phases and sub-processes form a complete content modification function that is responsive to user commands in accordance with certain embodiments. As can be further seen, this methodology and its variants can be implemented, for example, using the system architecture illustrated in FIG. 1 and described in Section B of this Detailed Description, although other systems and architectures can be used in other embodiments, as will be apparent in light of this disclosure. To this end, note that the example correlation of the various functions shown in FIGS. 2A-4 to specific modules of the system shown in FIG. 1 is not intended to imply any structural or modular limitations. Rather, other embodiments may include, for example, varying degrees of integration where functionality of one module is effectively integrated into another module instead of having two separate modules, etc. Thus, other embodiments may have fewer or more modules, depending on the granularity of implementation. Numerous variations and alternative configurations will be apparent in light of this disclosure.

The content modification functionality disclosed in this example embodiment is generally implemented in two phases. First, the content editor 142 is used to retrieve and modify content which has previously been stored in the content repository 340. A modification history module 143 detects and records in a modification history the user's content modifications. This may occur, for example, as the user accesses and edits content retrieved from the content repository 340. Modifications to binary data are detected using binary data handler 144, and snapshots of the original and modified binary data are saved using the data cache 332 associated with the CMS application server 330. Later, when the user invokes an undo or redo command via the content editor 142, the modification history module 143 uses the aforementioned modification history to restore the content to a previous state, or to return to a state that had been previously undone, in accordance with one such example embodiment. If applicable, the snapshot of the original or modified binary data can be retrieved from the data cache 332 to complete the undo or redo request. In addition, the volatile data listener 146 can be used, when applicable, to update volatile data within the modification history based on changes made as a result of undo or redo operations.

The functionality provided by modules such as the content editor 142, the modification history module 143, the binary data handler 144 and the volatile data listener 146 can be implemented using a browser 140 capable of supporting, for example, Adobe Flash applications and JavaScript applets. Thus a browser that supports such plug-ins will be capable of providing the functionalities described herein, even though the browser itself may not be specifically provided with or otherwise configured for specialized content modification functionality. Thus, in certain embodiments the various functionalities of an online CMS are primarily invoked via browser 140 and modules running thereon, although resources of the server 300 and/or data stored in the content repository 340 may also be accessed as appropriate. To this end, executable modules, such as the content editor 142, the modification history module 143, the binary data handler 144 and the volatile data listener 146, may be downloaded in real-time or otherwise as needed in response to browser-based client-side requests.

1. Detecting Content Modifications

Figure 2A:
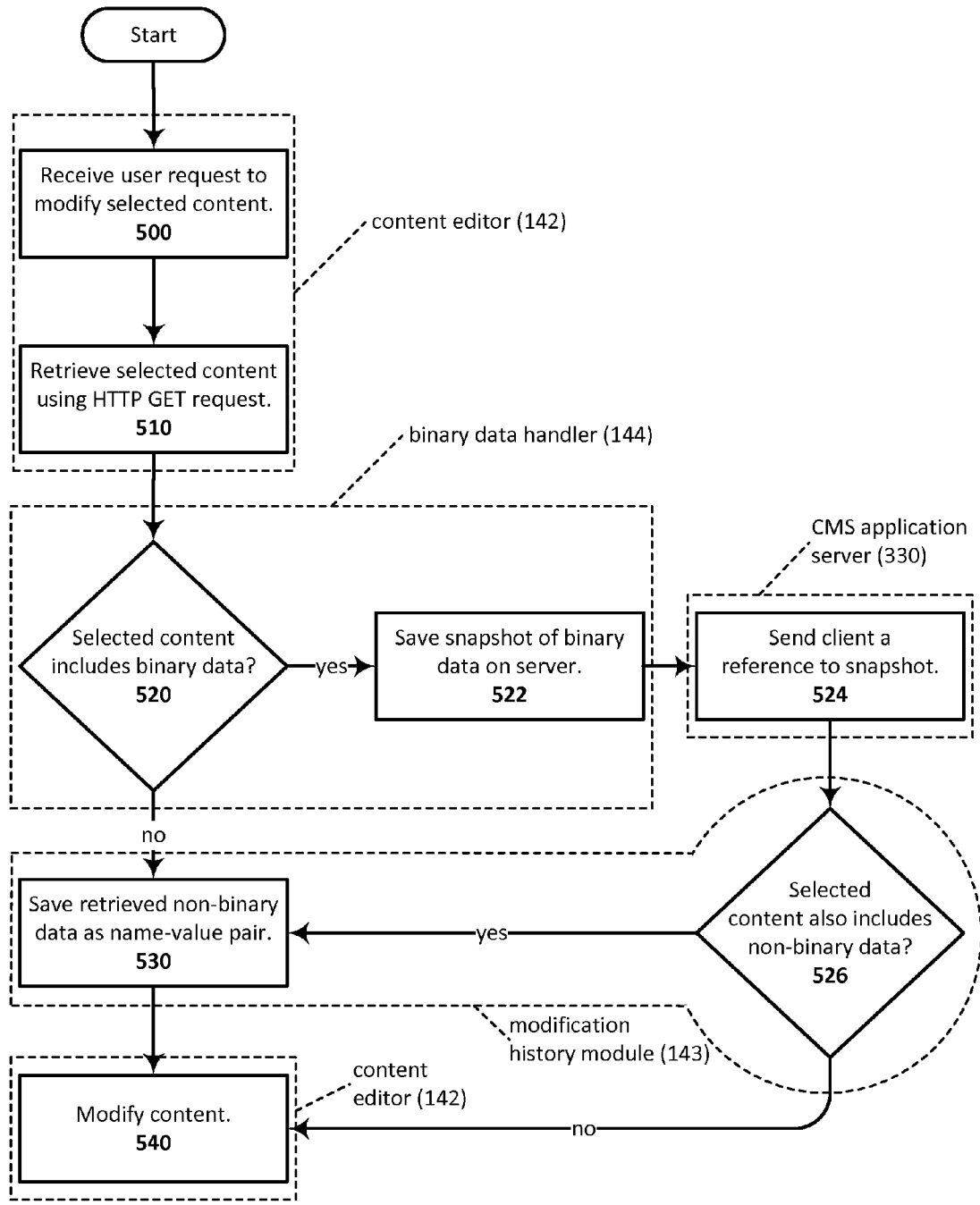
FIG. 2A illustrates a methodology for receiving a user request to modify content using the online content management system of FIG. 1, in accordance with an embodiment of the present invention.

As illustrated in FIG. 2A, in one embodiment the method commences with receiving 500 a user request to modify content. Such a request can occur, for example, when a user of one of the client computing systems 100 uses a browser-based content editor 142 to modify content that is managed by the CMS application server 330 and stored in the content repository 340. Such a request could also occur, for example, when the user creates new content that is to be stored in the content repository 340. However, regardless of the specific context in which the user request to modify content occurs, the CMS application server 330 and the content editor 142 provide an interface that allows the user to double-click, highlight or otherwise select a content segment that is to be modified. This interface can be based on a web application framework such as Apache Sling that uses well-defined HTTP requests to access content stored in the content repository 340. For example, in one embodiment a user scrolls through content stored in the content repository 340 using the browser 140 installed on a client computing system 100. The user double-clicks on a paragraph that he or she wishes to modify, thereby invoking the content editor 142 which generates the request to modify the selected content. If the user wishes to insert new content, this can be accomplished, for example, by creating, an empty object and then modifying the empty object to contain the new content. In other embodiments multiple objects can be selected for modification, such as multiple paragraphs or images included within the content.

In response to the user's request, the selected content can be retrieved 510 using, for example, an HTTP GET request generated by the content editor 142. The selected content can be retrieved directly from the content repository 340. As part of this process, the retrieved content is then intercepted and analyzed to determine 520 whether it includes binary data such as images, audio clips, video clips or other media assets. This determination 520 can be made, for instance, by a client-side binary data handler 144 that is configured to analyze certain marker fields embedded within the retrieved content that reflect the presence of binary data. The marker fields can be directly generated by the server 300 in response to the HTTP GET request, or can be determined implicitly by the client-side content editor 142 upon receiving the retrieved content. Where the marker fields are directly generated by the server 300, such marker fields may include, for example, a field with key "image" having value "#binary". Alternatively, where the marker fields are determined implicitly using client resources, the content editor 142 can be configured to evaluate the content type or types retrieved from the server 300. For example, if a content fragment of type "image" is received, then the content editor 1.42 can be programmed to assume that binary data are present. In contrast, in a case where the HTTP GET request returns to the content editor 142 a path referencing an image located elsewhere, this path would not be considered binary data, and the content editor would not assume the presence of binary data and any user modifications to the path could be managed without using server resources.

If binary data are present in the retrieved content, the binary data handler 144 sends a snapshot of the binary data to the server 300, where it is saved 522 in a data cache 332 managed by the CMS application server 330. This snapshot provides a record of the original state of the content before modification. The CMS application server 330 sends 524 a reference to the location where the snapshot is saved to the client computing system 100. The reference can be, for example, a hyperlink or address that identifies the memory location where the snapshot of the retrieved binary data is saved. This technique advantageously reduces or minimizes the amount of data stored using server resources. After the snapshot of the binary data is saved 522 and the reference to the saved location is sent 524 to the client computing system 100, it is further determined 526 whether the retrieved content also includes non-binary data. If not, the CMS application server 330 allows the user to modify 540 the selected content using content editor 142.

If it is determined that the selected content includes non-binary data, such as textual data, the modification history module 143 saves 530 the retrieved non-binary data as name-value pairs that indicate the original state of the non-binary content before modification. In certain embodiments the name-value pairs can be saved in the memory 120 of the client computing system 100, thereby advantageously reducing network traffic if the name-value pairs are to be accessed in the future. And because the name-value pairs do not include binary data, they can be easily cached by the client computing system 100 without consuming relevant computer resources. After the name-value pairs are saved 530, the CMS application server 330 allows the user to modify 540 the selected element using content editor 142.

The example methodology illustrated in FIG. 2A for retrieving selected content for modification advantageously allows an original state of both binary and non-binary data to be saved before the user begins modifying the selected content. The original state of non-binary data can be saved by one of the client computing systems 100, while the original state, or snapshot, of binary data can be saved using the resources of the server 300. This configuration reduces server load, network traffic and the frequency of page reload actions by using the resources of the client browser 140 when possible. But by invoking the processing and storage resources of the server 300 when appropriate, such as when the user seeks to change the state of binary data, this example configuration also provides for robust handling of modifications relating to such data. As illustrated in the example embodiment of FIG. 2A, this can be accomplished by intercepting retrieval requests for content managed by the CMA application server 330 and saving information that can be used later to perform undo or redo operations related to the retrieved content.

The process of content modification 540 can include a wide variety of operations, including standard text editing operations provided by content editor 142 that modify existing content, insert new content, remove content, move content and copy content. However, by analyzing the HTTP GET requests before the content is modified as illustrated in FIG. 2A, the content modification can also be a user-defined or otherwise customized action or extension that is integrated into the functionality of the CMA application server 330. This advantageously allows such customized extensions to take advantage of a robust undo and redo functionality without the need for additional coding, or configuration of such extensions.

FIG. 2B illustrates an example embodiment of a methodology for processing content modifications 540 that have been made by a user. After the user has finished modifying the selected content, an HTTP POST request can be used to persist 550 the modified content on the server 300. The modified content is then intercepted and analyzed to determine 560 whether it includes binary data. As with the HTTP GET request, this determination 560 can be made, for instance, using the client-side binary data handler 144 that is configured to analyze certain marker fields embedded within the modified content that reflect the presence of binary data. If binary data are present in the modified content, it is then determined 562 whether the binary data have been modified as compared to the snapshot taken before the modification occurred. For example, in one specific example such embodiment, the binary data handler 144 of the client-side (or some other client-side module, such as the content editor 142) can be configured to query the server if the binary data has changed. The server can then carryout the determination, for example, by comparing the last modification date of the binary data with the last modification date of the initially taken snapshot, and then pass the result of that determination to the client-side. Other embodiments may make this determination on the client-side based on, for example, knowledge of a given previous editing action associated with binary data modification (e.g., image manipulation command), or knowledge that no content associated with binary data was edited, or other such inference-based judgments.

If the binary data were not modified, then the snapshot of the binary data that was taken before the content was modified can optionally be deleted 564 from the server 300. The reference to the snapshot stored by the client computing system 100 is also optionally deleted. Deleting the snapshot and references thereto advantageously reduces cluttering of the content repository 340 and frees storage resources for other operations. In cases where the binary data are modified, the binary data handler 144 sends a snapshot of the modified binary data to the server 300, where it is saved 565 in the data cache 332 managed by the CMS application server 330. This modified snapshot provides a record of the modified state of the binary data. The CMS application server 330 sends 566 a reference to the location where the modified snapshot is saved to the client computing system 100. The reference can be, for example, a hyperlink or address that identifies the memory location where the modified snapshot is saved. This technique advantageously reduces or minimizes the amount of data stored using server resources. After the modified snapshot is saved 565 and the reference to the saved location is sent 566 to the client computing system 100, it is further determined 568 whether non-binary data were also modified. If not, one or more update actions corresponding to the detected modification are generated 580, as will be described in turn.

Where non-binary data were modified, either in addition to or independent of binary data, the modification history module 143 can be configured to detect which field or fields were modified, and to determine 570 the differences between the original field value and the modified field value. For example, in a case where the user modifies the content of a selected paragraph, a "text" field is detected as having been modified and the differences between the original and modified values of the text field are determined. As another example, in a case where the user modifies the displayed formatting of a selected paragraph, one or more of fields such as "font", "margins", "color" or "line spacing" can be detected as having been modified, and the differences between the original and modified values of the formatting features are also determined. Changes to property values in component dialog boxes can be detected as well. In embodiments wherein user-customized extensions or components are used to modify the content, additional or alternative fields can be detected as having been modified. After the appropriate fields and modifications associated with the non-binary data have been detected, one or more update actions corresponding to the detected modification are generated 580 by the modification history module 143.

As illustrated in the example embodiment of FIG. 2B, once the relevant fields and modifications are detected, an appropriate number of update actions can be generated 580. An update action can be thought of as a generic representation of a modification that can be undone or redone, such as the insertion of a new content segment, the revision of an existing content segment, the removal of an existing content segment, the modification of content formatting, or the translation of content to a different language. The update action contains the information that is used to subsequently undo or redo the modification. In certain embodiments the update action only contains the minimum amount of information necessary to undo or redo the modification, such as information identifying those fields or parts of the original and modified states which have actually changed via the modification. This advantageously reduces storage and data transfer requirements associated with maintaining and accessing a history of update actions. For example, in the aforementioned case where the user modifies the content of a selected paragraph, the resulting update action contains the state of the paragraph before and after the modification, which is sufficient to undo and redo the modification, respectively. It should be noted that a particular modification that a user may perceive as being a single modification can often be conceptualized as comprising multiple update actions. For example, a modification that involves moving a paragraph can result in the generation of a first update action corresponding to the paragraph removal, and a second update action corresponding to the paragraph insertion. In such cases a single modification may actually result in multiple update actions being generated.

By monitoring the HTTP GET and HTTP POST requests and detecting the changes made to content between those two requests, it is possible to maintain a robust modification history containing update actions that are generated as described above. This methodology works independently of the particular content modification that a user may perform, and thus is generally compatible with a wide variety of components used for content modification, particularly those components which use a web application framework such as Apache Sling that employs well-defined HTTP requests by the content editor 142 to access content stored in the content repository 340. Components which do not adhere to such requests, or which otherwise generate modifications which cannot reliably be monitored using HTTP requests such as GET and POST, can be added to a listing of unsupported components. In such embodiments the system can optionally be configured to provide the user with a warning message indicating that it may not be possible to undo or redo modifications made using such components.

Furthermore, by using the binary data handler 144 to detect the presence of binary data in the original content 520 and/or the modified content 560, it is possible to reduce network traffic and invoke server resources only where appropriate to handle such binary data. Storing the binary data snapshots using server resources, as described above, allows a comprehensive modification history to be generated and stored using only client resources. Such a modification history includes links to binary data stored using server resources, as appropriate. When the user invokes an undo or redo command, as described below with respect to FIGS. 3 and 4, this modification history provides the information used to perform the requested undo or redo operation.

As illustrated in FIG. 2C, in certain embodiments the modification history module 143 adds 585 update actions associated with the detected modifications to a modification history associated with the relevant content. In certain embodiments the modification history can be persisted locally at the relevant client computing system 100, such as using memory 120 or a cache associated with the browser 140. For example, in such embodiments the modification history can be persisted in a series of session cookies, or in the "window.name" property. This advantageously further reduces network traffic with the server 300 when the user later invokes undo or redo commands. In addition, by storing the modification history on a per page basis until the user's browser session ends, such history can be made to persist despite intermediate page reloads which may occur.

The modification history optionally contains a limited number of update actions. Providing such a limit reduces the amount of data used to store the history, although it also limits the number of actions that can be undone or redone. The limit on the number of items stored in the modification history, if any, can be user defined, set by an administrator or provisioned by default. In one embodiment the modification history is limited to no more than twenty update actions, although different limits, such as five, ten, fifteen, twenty-five, thirty or fifty update actions, can be implemented in other embodiments. Such a configuration setting can be saved, for example in a configuration setting module 336 that forms part of the CMS application server. In embodiments where such a limit exists, after a new update action or actions are added to the modification history it is determined 590 whether the number of items in the modification history exceeds the limit. If such a limit is exceeded, one or more update actions can be deleted from the modification history. For example, in one embodiment the oldest update action is deleted 592 from the modification history in this case. In a modified embodiment actions can be deleted from the modification history based on the age of the saved action. This functionality can be implemented by the modification history module 143. Configurations such as these advantageously reduce the likelihood that the modification history grows to a point where its management adversely affects other system processing and storage resources.

As described above with respect to binary data, in certain embodiments snapshots of binary data are used to detect and track modifications of binary data. The number of snapshots that are stored on the server 300 may also be limited in certain embodiments. Providing such a limit reduces the burden placed on the memory 320 and/or content repository 340 associated with the server, although it also limits the number of binary data modifications that can be undone or redone. In one embodiment the age of the snapshots stored using the resources of the server 300 is limited. This prevents such snapshots from continuing to use server resources even after the user may have finished working with the content. The limit on the age of snapshots stored using server resources, if any, can be user defined, set by an administrator or provisioned by default. In one embodiment the age of such snapshots is limited to ten hours, although different time limits, such as thirty minutes, one hour, two hours, five hours, fifteen hours or twenty-four hours, can be implemented in other embodiments. Such a configuration setting can be saved, for example in the configuration setting module 336 that forms part of the CMS application server. In embodiments where such a limit exists, after a new update action or actions are added to the modification history it is determined 594 whether the age of the oldest saved digital snapshot exceeds the limit. If such a limit is exceeded, one or more snapshots can be deleted from the server 300. For example, in one embodiment the oldest saved digital snapshot is deleted 596 from the server 300 in this case. In other embodiments the age of the oldest saved digital snapshot can be checked at another stage of the disclosed methodology, such as when the user stops working with the CMS application server, or at predetermined time intervals. In a modified embodiment the digital snapshots can be deleted based on a number of saved snapshots that are consuming server resources. This functionality can be implemented by the modification history module 143. Configurations such as these advantageously reduce the likelihood that the storage resources devoted to saving the digital snapshots adversely affect other actions of the server 300.

2. Undoing and Redoing Content Modifications

FIG. 3 illustrates an example embodiment for undoing an unwanted content modification using an online CMS. This methodology takes advantage of the modification history generated using the techniques for detecting content modifications disclosed in Section of this Detailed Description. The method commences with receiving 600 a user request to undo an unwanted content modification. Such a request can occur, for example, when a user of one of the client computing systems 100 issues a command to undo an unwanted content modification. Such a command could be invoked using the content editor 142, for example, by clicking on an icon, selecting a command from a menu, or pressing a keyboard shortcut associated with the command, such as Ctrl-Z. If the user attempts to apply the undo command to data that has been modified by an unsupported component, such as a component that generates modifications that cannot reliably be monitored by the HTTP GET and POST requests that are used to generate the modification history, the command is optionally cancelled to avoid data corruption or other unstable effects.

In response to the user's request, the modification history module 143 retrieves 610 the most recent update action from the modification history that has not already been undone. As noted previously, in certain embodiments the modification history is persisted locally at the relevant content computing system 100, thereby allowing the update action to be quickly retrieved without accessing the server. The update action contains information that can be used to restore the content to its original state before the unwanted modification occurred. If it is determined 620 that the original data to be restored include binary data, for example by using the binary data handler 144, a request 622 is sent to the server 300 containing the reference to the snapshot of the original data that had been previously generated at the time the unwanted content modification was first made (see reference numeral 524 in FIG. 2A). Thus, in such embodiments server resources are only accessed in cases where the original data to be restored include binary data.

Once the appropriate update action has been retrieved 610 from the modification history, and any modified binary data have been restored to the original state at the server 300, the modification history module 143 issues 630 an HTTP POST request to change the relevant field values from the modified value back to the original value. The relevant field, modified value and original value are defined in the update action retrieved 610 from the modification history. Such an HTTP POST request can be used to effectively undo the unwanted content modification and return the content to its original state before the unwanted modification was made. The updated content can then be displayed to the user via the browser 140. Highlighting is optionally used to provide an indication to the user of which portions of the content were affected by the undo operation.

FIG. 4 illustrates an example embodiment for redoing a previously undone content modification using an online CMS. This methodology also takes advantage of the modification history generated using the techniques for detecting content modifications disclosed in Section C.1 of this Detailed Description. The method commences with receiving 700 a user request to redo a previously undone content modification. Such a request can occur, for example, when a user of one of the client computing systems 100 issues a command to the CMS application server 300 to redo a previously undone content modification. Such a command could be invoked using the content editor 142, for example, by clinking on an icon, selecting a command for a menu, or pressing a keyboard shortcut associated with the command, such as Ctrl-Y.

In response to the user's request, the modification history module 143 retrieves 710 the most recent update action from the modification history that has previously been undone. Because the modification history is persisted locally at the relevant content computing system 100, the update action can be quickly retrieved without accessing the server. The update action contains information that can be used to reinstate a previously undone modification. If it is determined 720 that the original data to be restored include binary data, for example by using the binary data handler 144, a request 722 is sent to the server 300 containing the reference to the snapshot of the modified data that had been previously generated after the modification was first made (see reference numeral 566 in FIG. 2B). Thus, in such embodiments server resources are only used in cases where the modification to be reinstated includes binary data.

Once the appropriate update action has been retrieved 710 from the modification history, and any modified binary data have been restored to the modified state at the server 300, the modification history module 143 issues 730 an HTTP POST request to change the relevant field values from the original value back to the modified value. The relevant field, original value and modified value are defined in the update action retrieved 610 from the modification history. Such an HTTP POST request can be used to effectively reinstate the previously undone content modification and return the content to its modified state before the undo command was invoked. The modified content can then be displayed to the user via the browser 140. Highlighting is optionally used to provide an indication to the user of which portions of the content were affected by the redo operation.

In certain embodiments the information stored in the update actions may be volatile. For example, paths names or other types of hyperlinks are often used to address content in web design applications. When such linked data change as a result of the operation of the CMS application server 330, other links within the modification history should be updated as well. For example, if a paragraph is deleted and the deletion is later undone, then the restored paragraph may be addressable by a new path that is different from the original path. If other update actions stored in the modification history refer to the restored paragraph, such references should be adjusted to refer to the new path to avoid data corruption and maintain system stability. Such adjustments can be implemented using a volatile data listener 146 module that is executed by a client's browser 140. As illustrated in the context of the example undo methodology provided in FIG. 3, the volatile data listener 146 can be configured to (a) identify 640 volatile data links within the modification history that refer to the unwanted modification that was undone, and (b) update such links to refer to a new address of the original content that was restored by the undo command. Likewise, as illustrated in the context of the example redo methodology provided in FIG. 4, the volatile data listener 146 can be configured to (a) identify 740 volatile data links within the modification history that refer to the restored modification, and (b) update such links to refer to a new address of the reinstated modification that was restored by the redo command. Thus, using the volatile data listener 146 allows the integrity of the volatile data within the modification history to be maintained even as a given modification is undone or redone.

In certain embodiments the user may invoke an undo or redo command intended to undo or redo several modifications at once. Examples of such operations might include (a) undoing or redoing both text addition and format changes applied to a paragraph, or (b) undoing or redoing the cutting and pasting of a paragraph from one location to another. A user may apply multiple operations to a single content segment by, for example, highlighting, clicking on, or otherwise selecting the content segment before invoking the undo or redo command. In such cases, the methodology for undoing unwanted modifications illustrated in FIG. 3, or the methodology for reinstating previously undone modifications illustrated in FIG. 4, can be repeated multiple times. Thus the undo and redo commands can be broken into multiple actions which are implemented individually. The content can be returned to its original or modified state by iteratively generating HTTP POST requests based on those update actions that are applicable to the selected content.

D. Undo/Redo Configuration Settings

As described previously, and as illustrated in the example embodiment of FIG. 1, in certain embodiments the CMS application server 330 includes a configuration settings manager 336 that can be used to store various configuration settings. In such embodiments the configuration settings manager 336 can be used to administer how selected aspects of the CMS application server 330 operate, including the undo and redo commands described herein. In some embodiments these options and settings can be adjusted only by specifically designated users with administrator rights, although in other embodiments these settings can be adjusted by any user. Such settings can be accessed, for example using a browser 140 running on one of the client computing systems 100, or using a dedicated application executed using the resources of server 300. However, in other embodiments, one or more of these options and settings are not configurable, are hard coded or are otherwise provisioned by default.

Thus, in an example embodiment of the CMS application server 330, certain configuration settings are adjustable using the configuration setting manager 336. Table A provides examples of selected configuration settings and values which can be useful in certain embodiments; additional or alternative configuration settings may be provided in other embodiments of the configuration settings manager 336. Thus it will be appreciated that the claimed invention is not intended to be limited to any particular set of configuration settings or default configuration values.

TABLE A

Example configuration settings of CMS application server.

| Property Name | Description | Example Values |
| --- | --- | --- |
| Enable Undo/Redo | Determines whether the undo and redo commands are available to users of the CMS application server. | enabled (default) disabled |

TABLE A-continued

Example configuration settings of CMS application server.

| Property Name | Description | Example Values |
| --- | --- | --- |
| Binary Data Path | Defines the storage location where snapshots of binary data are persisted. | /var/undo (default) |
| Minimum Validity | Determines the minimum amount of time that binary data snapshots are persisted, after which such data are subject to deletion. | 1 hour<br>5 hours<br>10 hours (default)<br>24 hours |
| Maximum Steps | Determines the maximum number of update actions which are persisted in the modification history. | 5 actions<br>10 actions (default)<br>20 actions |
| Persistence Class | Determines where the modification history is persisted. | window.name (default)<br>browser cookies |
| Persistence Mode | Determines how frequently the modification history is updated. | after each page edit (default)<br>after each page reload |
| Marker Mode | Determines how content affected by undo or redo commands is indicated to the user. | no indication<br>highlight affected content (default)<br>select affected content |
| Supported Components | Provides a list of supported components for which update actions are recorded in the modification history. | insert content<br>delete content<br>adjust formatting<br>etc . . . |
| Unsupported Components | Provides a list of unsupported components for which update actions are not recorded in the modification history. | not provided initially |

Thus, for example, a user wishing to change the storage location where snapshots of binary data are persisted can invoke the configuration settings manager 336 to edit the Binary Data Path plurality from its default value of "/var/undo" to a customized location. Likewise, a user working with a customized component that should not be affected by the undo or redo commands can include that component in the listing of Unsupported Components, and can thereby prevent update actions from being generated as a result of content modifications caused by the customized component. Other settings can be adjusted in a similar fashion. Thus the configuration settings manager 336 advantageously provides the user with a centralized interface for adjusting settings which affect the operation and behavior of the undo and redo commands.

E. Conclusion

Numerous variations and configurations will be apparent in light of this disclosure. For instance, one example embodiment provides a content modification tracking system. The system includes a modification history module configured to detect a plurality of content modifications and generate a modification history containing a plurality of update actions corresponding to the plurality of content modifications, wherein the modification history is stored on a client computer. The system further includes a binary data handler configured to (a) detect the presence of binary data in at least one of the plurality of content modifications detected by the modification history module and (b) save a snapshot of the detected binary data on a server that is in communication with the client computer. In some cases, the binary data handler detects the presence of binary data by, for example, analyzing a marker field embedded within one or more of the plurality of content modifications. In some cases, the modification history module detects at least one of the plurality of content modifications by comparing (a) original content obtained via a GET request submitted to the server with (b) modified content submitted to the server via a POST request. In some cases, the system includes a server-side content management system (CMS) application server that is configured to store the snapshot in a data cache that forms part of the CMS application server, and send a reference to the snapshot to the modification history module. In some cases, the modification history module is further configured to delete one of the plurality of update actions when the modification history includes a quantity of update actions that exceeds a threshold value. In some cases, a selected one of the plurality of update actions includes an affected field, an original value of the affected field and a modified value of the affected field. In some cases, saving the snapshot of the detected binary data includes saving a first snapshot of an original state of the detected binary data and saving a second snapshot of a modified state of the detected binary data, and a selected one of the plurality of update actions includes a reference to the first snapshot and a reference to the second snapshot. In some cases, saving the snapshot of the detected binary data includes saving a first snapshot of an original state of the detected binary data and saving a second snapshot of a modified state of the detected binary data. In some cases, in response to an undo command, the binary data handler is further configured to instruct the server to replace a modified version of the binary data with the snapshot of the detected binary data. In some cases, saving the snapshot of the detected binary data includes saving a first snapshot of an original state of the detected binary data and saving a second snapshot of a modified state of the detected binary data, and in response to a redo command, the binary data handler is further configured to instruct the server to replace the first snapshot of the original state of the detected binary data with the second snapshot of the modified state of the detected binary data. In some cases, the modification history module and the binary data handler are executing in a browser running on the client computing system. In some cases, the system includes a content editor executing on a browser running on the client computing system, the content editor being used to generate the plurality of content modifications. In some cases, the system includes a volatile data listener executing on a browser running on the client computing system, the volatile data listener configured to modify at least one of the update actions in response to one of the content modifications.

Another embodiment of the present invention provides a content modification tracking methodology. The methodology includes detecting a plurality of content modifications, generating a modification history containing a plurality of update actions corresponding to the plurality of content modifications, and storing the modification history on a client computer. The method further includes detecting the presence of binary data in at least one of the plurality of content modifications, and saving a snapshot of the detected binary data on a server that is in communication with the client computer. In some cases, at least one of the plurality of content modifications is detected by comparing (a) original content obtained via an HTTP GET request submitted to the server with (b) modified content submitted to the server via an HTTP POST request. In some cases, the method includes generating a link that references a location on the server where the snapshot is saved, wherein the modification history includes the link. In some cases, the method includes deleting one of the plurality of update actions when the modification history includes a quantity of update actions that exceeds a threshold value. In some cases, the method includes deleting the snapshot of the detected binary data after the snapshot has persisted on the server for a period of time that exceeds a threshold value. In some cases, a selected one of the plurality of update actions includes an original field value and a modified field value, the method further including changing the modified field value to the original field value in content stored in a data repository coupled to the server. In some cases, a selected one of the plurality of update actions includes an original field value and a modified field value, the method further including changing the original field value to the modified field value in content stored in a data repository coupled to the server. In some cases, the presence of binary data is detected, for example, by analyzing a marker field embedded within one or more of the plurality of content modifications.

Another embodiment of the present invention provides a non-transient computer readable medium having instructions encoded thereon that, when executed by one or more processors causes a content modification process to be carried out. The process includes detecting a plurality of content modifications, generating a modification history containing a plurality of update actions corresponding to the plurality of content modifications, and storing the modification history on a client computer. The process further includes detecting the presence of binary data in at least one of the plurality of content modifications, and saving a snapshot of the detected binary data on a server that is in communication with the client computer. In some cases, the content modification process further includes saving a first snapshot of an original state of the detected binary data on the server, and saving a second snapshot of a modified state of the detected binary data on the server. In some cases, a selected one of the plurality of update actions includes an original field value and a modified field value, the content modification process further includes changing the modified field value to the original field value in content stored in a data repository coupled to the server. In some cases, a selected one of the plurality of update actions includes an original field value and a modified field value, the content modification process further includes changing the original field value to the modified field value in content stored in a data repository coupled to the server.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A content modification tracking system that comprises a memory device and a processor that is operatively coupled to the memory device, wherein the processor is configured to execute instructions stored in the memory device that, when executed, cause the processor to carry out a content modification tracking process that comprises:
    detecting a plurality of modifications to an electronic document, wherein the modifications are provided via a document editing user interface provided at a client computer;
    detecting that at least one of the plurality of modifications is a modification of binary data in the electronic document that causes an original state of the binary data to change to a modified state of the binary data;
    generating a first snapshot of the original state of the binary data;
    generating a second snapshot of the modified state of the binary data;
    sending the first and second snapshots to a server computer;
    generating, at the client computer, a modification history comprising a first update action corresponding to a modification of non-binary data in the electronic document, and a second update action corresponding to the modification of binary data;
    storing the modification history on the client computer;
    in response to an undo command, instructing the server computer to replace the modified state of the binary data with the original state of the binary data; and
    in response to a redo command received after the undo command, instructing the server computer to replace the original state of the binary data with the modified state of the binary data;
    wherein the first update action includes data that allows the modification of non-binary data to be undone or redone without accessing information saved on the server computer; and
    wherein the second update action includes links to the first and second snapshots stored on the server computer.

2. The content modification tracking system of claim 1, wherein detecting that at least one of the plurality of modifications is a modification of binary data further comprises analyzing a marker field embedded within one or more of the modifications.

3. The content modification tracking system of claim 1, wherein at least one of the modifications is detected by comparing (a) original content obtained via a GET request submitted to the server computer with (b) modified content submitted to the server computer via a POST request.

4. The content modification tracking system of claim 1, wherein the content modification tracking process further comprises:
    storing the first and second snapshots in a data cache that forms part of a content management system application server hosted by the server computer; and sending a reference to the first and second snapshots from the server computer to the client computer.

5. The content modification tracking system of claim 1, wherein the content modification tracking process further comprises deleting one of the update actions when the modification history includes a quantity of update actions that exceeds a threshold value.

6. The content modification tracking system of claim 1, wherein at least one the first and second update actions includes an affected field, an original value of the affected field, and a modified value of the affected field.

7. The content modification tracking system of claim 1, wherein the content modification tracking process is invoked in a browser running on the client computer.

8. The content modification tracking system of claim 1, wherein the document editing user interface is invoked in a content editor that is, in turn, invoked in a browser running on the client computer.

9. The content modification tracking system of claim 1, wherein the content modification tracking process further comprises modifying at least one of the first and second update actions in response to one of the plurality of modifications.

10. A content modification tracking method comprising:
   detecting a plurality of modifications to an electronic document, wherein the modifications are provided via a document editing user interface provided at a client computer;
   detecting that at least one of the plurality of modifications is a modification of binary data in the electronic document that causes an original state of the binary data to change to a modified state of the binary data;
   generating a first snapshot of the original state of the binary data;
   generating a second snapshot of the modified state of the binary data;
   sending the first and second snapshots to a server computer;
   generating, at the client computer, a modification history comprising a first update action corresponding to a modification of non-binary data in the electronic document, and a second update action corresponding to the modification of binary data;
   storing the modification history on the client computer;
   in response to an undo command, instructing the server computer to replace the modified state of the binary data with the original state of the binary data; and
   in response to a redo command received after the undo command, instructing the server computer to replace the original state of the binary data with the modified state of the binary data;
   wherein the first update action includes data that allows the modification of non-binary data to be undone or redone without accessing information saved on the server computer; and
   wherein the second update action includes links to the first and second snapshots stored on the server computer.

11. The content modification tracking method of claim 10, wherein at least one of the modifications is detected by comparing (a) original content obtained via a GET request submitted to the server computer with (b) modified content submitted to the server computer via a POST request.

12. The content modification tracking method of claim 10, further comprising
   generating a first link that references a first location on the server computer where the first snapshot is saved; and
   generating a second link that references a second location on the server computer where the second snapshot is saved, wherein the modification history includes the first and second links.

13. The content modification tracking method of claim 10, further comprising deleting one of the update actions when the modification history includes a quantity of update actions that exceeds a threshold value.

14. The content modification tracking method of claim 10, further comprising deleting at least one of the first and second snapshots after the deleted snapshot has persisted on the server computer for a period of time that exceeds a threshold value.

15. The content modification tracking method of claim 10, wherein:
   one of the update actions includes an original field value and a modified field value; and
   the method further comprises changing the modified field value to the original field value in content stored in a data repository associated with the server computer.

16. The content modification tracking method of claim 10, wherein:
   one of the update actions includes an original field value and a modified field value; and
   the method further comprises changing the original field value to the modified field value in content stored in a data repository associated with the server computer.

17. The content modification tracking method of claim 10, wherein detecting that at least one of the plurality of modifications is a modification of binary data further comprises analyzing a marker field embedded within one or more of the modifications.

18. A non-transitory computer readable medium having instructions encoded thereon that, when executed by one or more processors, cause a content modification tracking process to be carried out, the process comprising:
   detecting a plurality of modifications to an electronic document, wherein the modifications are provided via a document editing user interface provided at a client computer;
   detecting that at least one of the plurality of modifications is a modification of binary data in the electronic document that causes an original state of the binary data to change to a modified state of the binary data;
   generating a first snapshot of the original state of the binary data;
   generating a second snapshot of the modified state of the binary data;
   sending the first and second snapshots to a server computer;
   generating, at the client computer, a modification history comprising a first update action corresponding to a modification of non-binary data in the electronic document, and a second update action corresponding to the modification of binary data;
   storing the modification history on the client computer;
   in response to an undo command, instructing the server computer to replace the modified state of the binary data with the original state of the binary data; and
   in response to a redo command received after the undo command, instructing the server computer to replace the original state of the binary data with the modified state of the binary data;
   wherein the first update action includes data that allows the modification of non-binary data to be undone or redone without accessing information saved on the server computer; and wherein the second update action includes links to the first and second snapshots stored on the server computer.

19. The non-transitory computer readable medium of claim 18, wherein:
   one of the update actions includes an original field value and a modified field value; and
   the content modification tracking process further comprises changing the modified field value to the original field value in content stored in a data repository associated with the server computer.

20. The non-transitory computer readable medium of claim 18, wherein:
   one of the update actions includes an original field value and a modified field value; and
   the content modification tracking process further comprises changing the original field value to the modified field value in content stored in a data repository associated with the server computer.

* * * * *